United States Patent
Darling et al.

(10) Patent No.: US 8,547,230 B1
(45) Date of Patent: Oct. 1, 2013

(54) UNOBTRUSIVE PROPRIOCEPTIVE MONITOR FOR SHIPPING CONTAINERS AND VEHICLES

(75) Inventors: David R. Darling, Orlando, FL (US); Percy N. Funchess, III, Orlando, FL (US); Timothy Johnson, Niskayuna, NY (US); Eladio Clemente Delgado, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 495 days.

(21) Appl. No.: 11/779,154

(22) Filed: Jul. 17, 2007

Related U.S. Application Data

(60) Provisional application No. 60/807,593, filed on Jul. 17, 2006.

(51) Int. Cl.
*G08B 1/08* (2006.01)
*G08B 13/14* (2006.01)

(52) U.S. Cl.
USPC ............... 340/572.1; 340/539.13; 340/539.22

(58) Field of Classification Search
None
See application file for complete search history.

(56) References Cited

U.S. PATENT DOCUMENTS

| | | | |
|---|---|---|---|
| 7,040,139 B2 * | 5/2006 | Sunshine | 73/23.2 |
| 7,298,257 B2 * | 11/2007 | Suzuki | 340/539.12 |
| 2005/0128087 A1 * | 6/2005 | Claessens et al. | 340/572.8 |
| 2006/0038683 A1 * | 2/2006 | Claessens et al. | 340/572.1 |
| 2006/0055552 A1 * | 3/2006 | Chung et al. | 340/686.1 |
| 2006/0086808 A1 * | 4/2006 | Appalucci et al. | 235/492 |
| 2007/0210912 A1 * | 9/2007 | Lynt, III | 340/517 |
| 2007/0257111 A1 * | 11/2007 | Ortenzi | 235/385 |
| 2007/0268134 A1 * | 11/2007 | Twitchell, Jr. | 340/568.1 |
| 2007/0268138 A1 * | 11/2007 | Chung et al. | 340/572.1 |
| 2007/0268139 A1 * | 11/2007 | Sweeney, II | 340/572.1 |
| 2008/0211674 A1 * | 9/2008 | Gibson et al. | 340/572.1 |
| 2008/0277594 A1 * | 11/2008 | Wagner et al. | 250/432 PD |
| 2008/0303638 A1 * | 12/2008 | Nguyen et al. | 340/10.42 |

OTHER PUBLICATIONS

0 "Active RFID Tags Monitor Condition of Global Shipments, Savi Technology", http://news.thomasnet.com/fullstory/484178/14 Thomas Net Industrial News Room Jul. 13, 2006 , 1-4.
0 "Research and Technology—Is this group magic of method?", *MFCSpirit* , 12-14.
0 "Savi Technology Savi Sensor Tags", http://www.savi.com/producst/pr.rfid.security.shtml Savi Technology A Lockheed Martin Company Jul. 13, 2006 , 1-2.

* cited by examiner

*Primary Examiner* — Julie Lieu
(74) *Attorney, Agent, or Firm* — Withrow & Terranova, PLLC

(57) ABSTRACT

An identification system and method comprising attaching an identification tag to an inside surface of a shipping container port cover and communicating data from the tag via electromagnetic radiation.

16 Claims, 3 Drawing Sheets

UNOBTRUSIVE PROPRIOCEPTIVE MONITOR FOR SHIPPING CONTAINERS AND VEHICLES

CROSS-REFERENCE TO RELATED APPLICATIONS

This application claims priority to and the benefit of the filing of U.S. Provisional Patent Application Ser. No. 60/807,593, entitled "Unobtrusive Proprioceptive Monitor for Military Shipping Containers", filed on Jul. 17, 2006, and the specification thereof is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to Radio Frequency Identification (RFID) tags and associated sensors.

2. Description of Related Art

RFID tags are the new "bar code" that electronically provide product information such as part number, serial number, and manufacturer. They typically come in two types: passive, where they hold a small amount of information and get their power from the reader; and active, where they provide their own power, can be programmed, and hold larger quantities of data.

However, there is a need for tags that play both active and passive roles and that also meet system use extremes. For example, a tag on a large sensitive asset such as a missile could usefully provide passive information such as part number, serial number, and other important static information. It could also integrate active elements such as an environmental monitoring system that senses for temperature and humidity.

The present invention provides such RFID technology, preferably deployed in conjunction with a shipping container document port or other unobtrusive container location.

BRIEF SUMMARY OF THE INVENTION

The present invention is of an identification system and method comprising: attaching an RFID identification tag to the inside surface of a shipping container document port cover, with or without modification of the cover, which tag communicates data via electromagnetic radiation. In the preferred embodiment, electronics receive data from sensors and electronics and then send the received data via the identification tag. The sensors can be one or any combination of shock sensors, temperature sensors, humidity sensors, global position sensors, gyroscopic sensors, light sensors, radiation sensors, chemical sensors, biological agent sensors, door open/closed sensors, and magnetic field sensors. Sensors may be attached to the cover and/or remote from the cover. Preferably a computer receives and analyzes the sent data. The identification tag transmits data via one or more of radio frequencies, cellular frequencies, and satellite communications frequencies. The cover may be for containers including food shipping containers, pharmaceutical shipping containers, and military shipping containers.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention provides an integrated RFID tag with integrated electronic and mechanical sensors, as well as an unobtrusive mounting system for same. The RFID tag is preferably mounted inside a shipping container's document port. The invention includes sensors that measure conditions inside the container (e.g., temperature, humidity, shock). A microcontroller on the tag conserves energy so that the device can operate for extended periods of time (10-20 years) without battery recharge or replacement. RFID technology is used to transmit over-limit event information to a reader that has been brought into near proximity to the container and is outside of the document port.

The invention provides: (1) Potential compatibility with emerging Department of Defense RFID standards for passive and active tags; (2) Higher accuracy of information and survivability of tags; (3) Proactive inspection of equipment prior to deployment; and (4) Integration with existing condition monitoring and logistics systems (e.g., root cause assessment of shipping or storage damage).

Currently, tags are typically located externally on the outside surface of an item or its container (to prevent signal attenuation and facilitate mass data collection). The port location used in the present invention provides protection from the external environment, allows integration with an internal system, and helps prevent unauthorized tampering. It also provides for a compact RFID/sensor system design.

This solution differs from other known solutions in that it requires a small RFID tag to fit in the location and a means to provide communication to the tags' transceiver (through the tag antenna). Most other tags (even without sensors) are too large and bulky to fit in a 3-inch space. An advantage of using this invention is that it has the potential to reduce costs for warranted systems, reduce the amount of time to manually collect system ID data, reduce the number of "lost" items, and increase system availability by providing condition assessment for re-usable systems.

Figure 1:
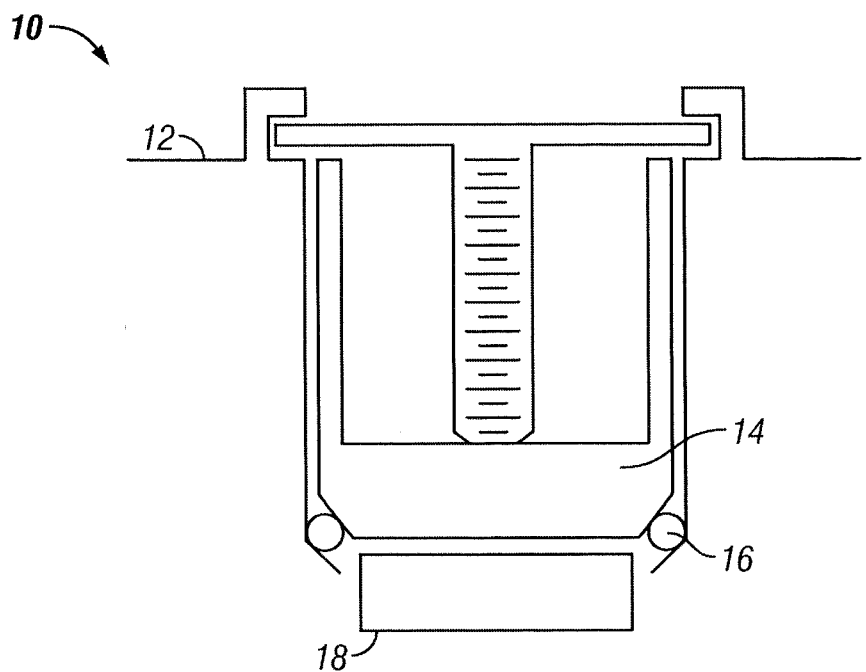
FIG. 1 is a cut-away schematic view of the present invention as deployed with a shipping container document port cover.
Figure 2:
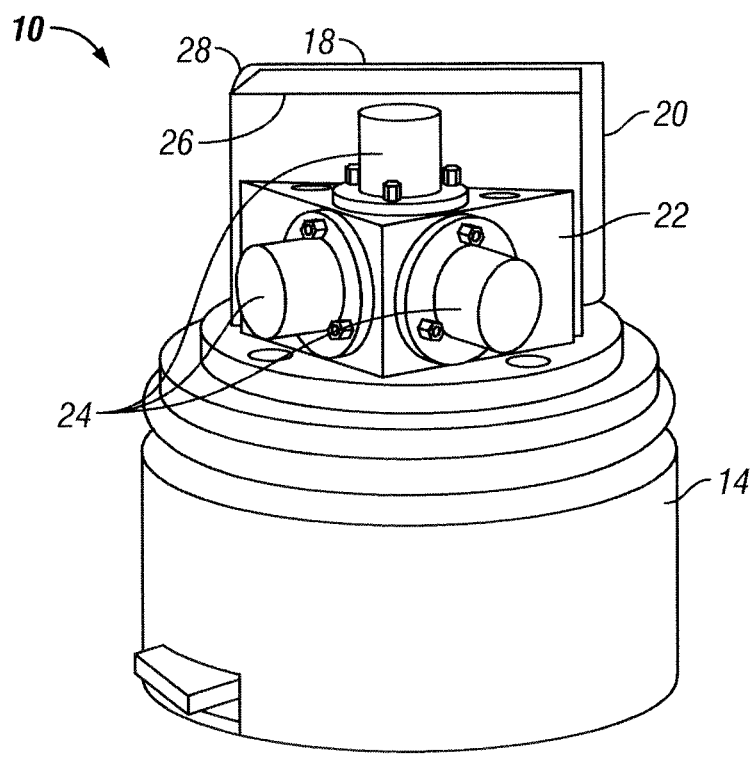
FIG. 2 is a perspective view of an embodiment of the invention of FIG. 1.

FIG. 1 shows the present invention 10 comprising the combined RFID tag/sensor system 18 deployed inside container 12 and situated on document port cover 14 comprising seal 16. In one embodiment, the container 12 may be sealed. FIG. 2 shows a particular embodiment in which the combined RFID tag/sensor system comprises onboard power 20, shock sensor mounting block 22, positional low power shock sensors 24, antenna 26 (internal or external), and temperature/humidity sensor 28. Other sensors now known or later developed in the art can similarly be integrated, such as global position sensors, gyroscopic sensors, light sensors, radiation sensors, chemical sensors, biological agent sensors, door open/closed sensors, magnetic field sensors, and the like.

The embodiment of FIG. 2 as designed has the following features: RFID tag functionality; wireless sensor data transmission; out-of-specification conditions controls; asynchronous sensor driven interrupts; resettable sensors; state and measured value data capture; 2.5 year battery life (Single Li coin cell); container and system internal application; temperature range of −54 degrees C. to 74 degrees C.; relative humidity range of 0-100%; shock range of +/−150 G in 3 axes; low cost; monitor times settable by user; RS232 and USB Interface (reader); and not subject to export control under current laws.

Figure 3:
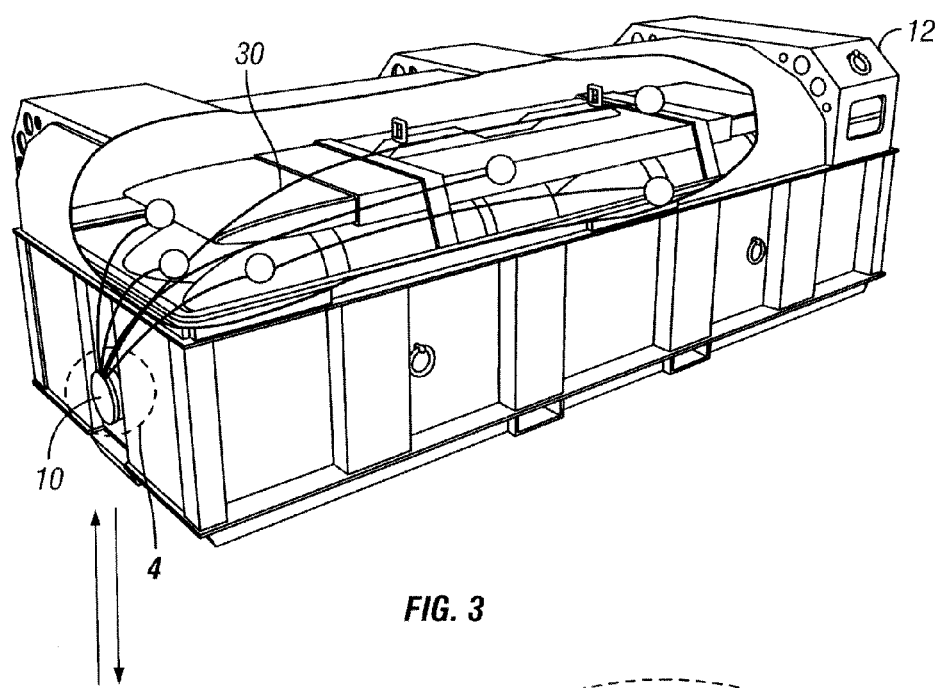
FIG. 3 is a perspective cut-away view of another embodiment of the invention connecting to tethered sensors.
Figure 4:
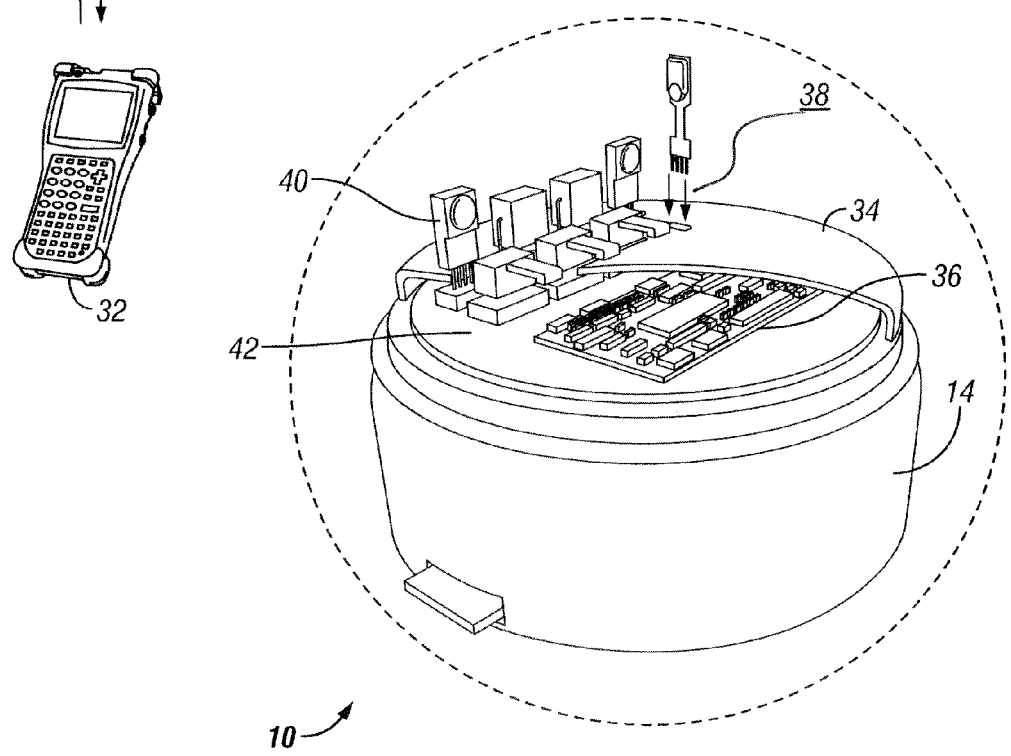
FIG. 4 is a perspective cut-away view of preferred electrical components used in the embodiment of FIG. 3.

FIGS. 3 and 4 show an embodiment adding tethered sensors 30 to the system of the invention. Each of the sensors can be one of the varieties of types listed above. In this embodiment, the RFID tag/sensor system preferably comprises protective cover 34, mother board 36, tethered sensor input 38, plug-in sensors 40 (e.g., six to eight in number), and backplane or interconnect 42. Of course, tethering can be accomplished by use of physical cabling or by use of any of a wide variety of wireless technologies now know or later developed.

Applications of the present invention include: (1) general shipping containers providing for location and user defined activity states, including pharmaceutical and food industry shipping containers of nearly any size; (2) weapon system inventory management, including item waypoint and real-time location identification and tracking and condition sensing during storage and handling; (3) industrial vehicles in which the system of the invention is integratable, including location and tracking and performance and maintenance (scheduled and/or required); and (4) military vehicles, including location and tracking, performance over nominal (idle) and extreme conditions, and prognostics (data analysis and failure trending).

Figure 5:
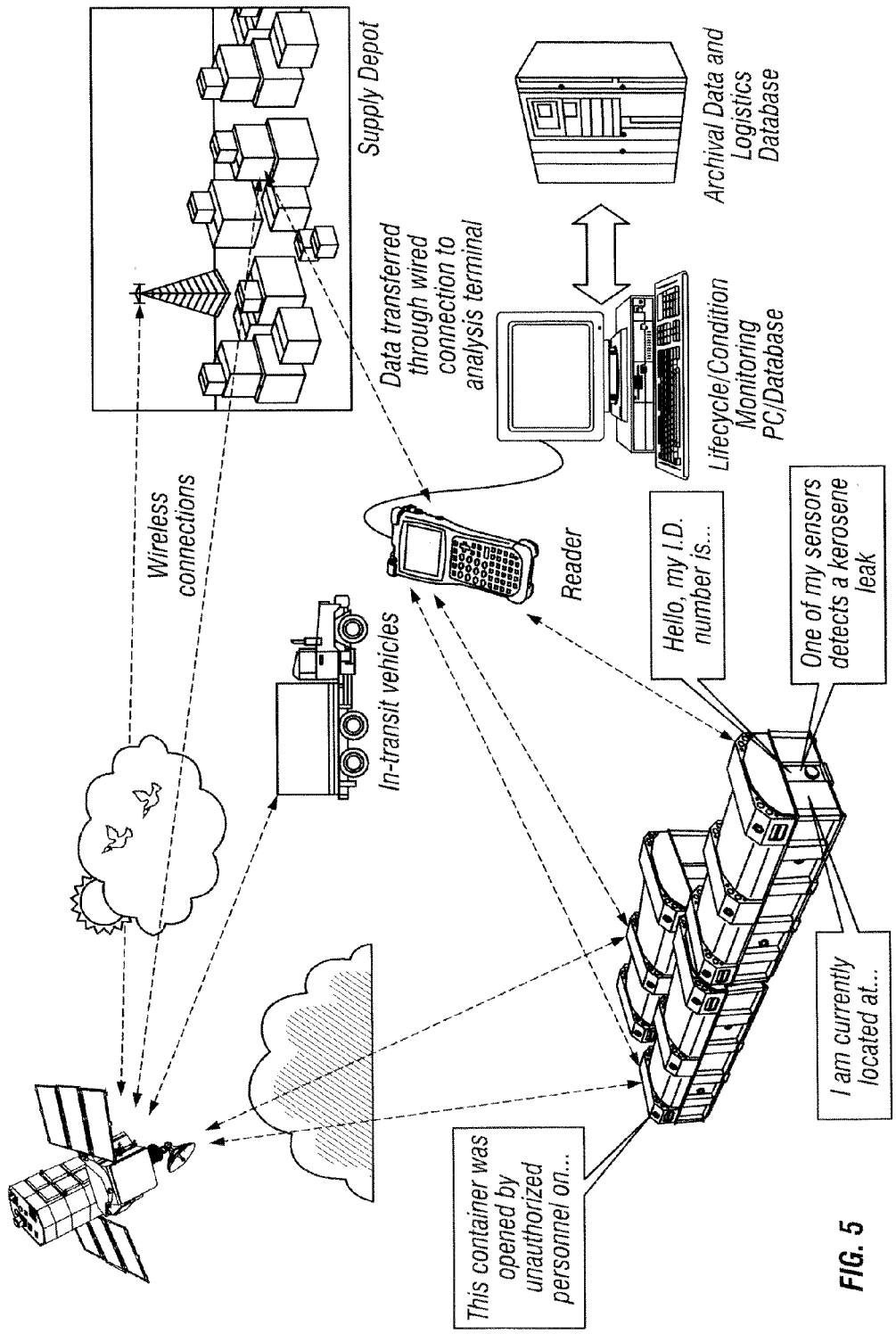
FIG. 5 is a schematic diagram illustrating methods of use of the invention.

Communication technologies usefully employed with the present invention include: RFID—local use (1' to 30' range); Cellular—continent (urban and networked access); and Satellite—global reach (Iridium, JSAT). FIG. 5 is illustrative of methods of use of the invention employing a plurality of communication modes and use of the data acquired for a plurality of purposes.

Although the invention has been described in detail with particular reference to these preferred embodiments, other embodiments can achieve the same results. Variations and modifications of the present invention will be obvious to those skilled in the art and its intended to cover in the appended claims all such modifications and equivalents. The entire disclosures of all references, applications, patents, and publications cited above are hereby incorporated by reference.

What is claimed is:

1. An identification system comprising an identification tag attached to an inside surface of a shipping container port cover comprising a seal configured to seal the inside surface of the shipping container port cover from the atmosphere, which identification tag communicates data via electromagnetic radiation, electronics configured to receive the data from at least one sensor located within a volume of a shipping container and that is configured to generate the data, the data identifying a sensed condition within the volume of the shipping container to which the shipping container port cover is affixed, and electronics configured to send sending the received data via said identification tag, and wherein said identification tag communicates the data to a receiver outside of the shipping container when the shipping container port cover is closed.

2. The system of claim 1 wherein said at least one sensor is selected from a group consisting of shock sensors, temperature sensors, humidity sensors, global position sensors, gyroscopic sensors, light sensors, radiation sensors, chemical sensors, biological agent sensors, door open/closed sensors, and magnetic field sensors.

3. The system of claim 1 wherein said at least one sensor is are attached to the inside surface of the shipping container port cover.

4. The system of claim 1 wherein said at least one sensor is are remote from the shipping container port cover.

5. The system of claim 1 additionally comprising a computer receiving and analyzing the sent data.

6. The system of claim 1 wherein said identification tag transmits data via one or more frequencies selected from a group consisting of radio frequencies, cellular frequencies, and satellite communications frequencies.

7. A shipping container document port cover configured to cover a document port of a shipping container, comprising:
   a seal configured to seal an inside surface of the shipping container document port cover from the atmosphere;
   a mounting plate attachable to the inside surface of the shipping container document port cover without modification of the shipping container document port cover;
   an identification tag attached to said mounting plate, which identification tag communicates data via electromagnetic radiation;
   a sensor coupled to the identification tag, the sensor located within a volume of the shipping container and configured to generate data identifying a sensed condition within the volume of the shipping container; and
   wherein said identification tag is further configured to communicate the data to a receiver outside of the shipping container when the shipping container document port cover of the shipping container is closed.

8. The cover of claim 7 wherein said shipping container document port cover is for a container selected from a group consisting of food shipping containers, pharmaceutical shipping containers, and military shipping containers.

9. An identification method comprising the steps of:
   attaching an identification tag to an inside surface of a shipping container port cover, the shipping container port cover comprising a seal configured to seal an inside surface of the shipping container port cover from the atmosphere;
   communicating data from the identification tag via electromagnetic radiation to a receiver outside of a shipping container when the shipping container port cover is closed;

via electronics receiving data from at least one sensor and via electronics sending the received data via the identification tag; and connecting the at least one sensor to the electronics receiving the data, wherein the at least one sensor is located within a volume of the shipping container and is configured to generate the data, which identifies a sensed condition within the volume of the shipping container when the shipping container port cover is closed.

10. The method of claim 9 wherein the at least one sensor is selected from a group consisting of shock sensors, temperature sensors, humidity sensors, global position sensors, gyroscopic sensors, light sensors, radiation sensors, chemical sensors, biological agent sensors, door open/closed sensors, and magnetic field sensors.

11. The method of claim 9 wherein the at least one sensor is attached to the inside surface of the shipping container port cover.

12. The method of claim 9 wherein the at least one sensor is remote from the shipping container port cover.

13. The method of claim 9 additionally comprising the step of via a computer receiving and analyzing the sent data.

14. The method of claim 9 wherein the identification tag transmits data via one or more frequencies selected from a group consisting of radio frequencies, cellular frequencies, and satellite communications frequencies.

15. The method of claim 9 wherein the shipping container port cover is for a shipping container selected from a group consisting of food shipping containers, pharmaceutical shipping containers, and military shipping containers.

16. The shipping container document port cover of claim 7, wherein the shipping container comprises a sealed shipping container, the sensor comprises a humidity sensor, and the sensed condition comprises a humidity within the volume of the shipping container.

\* \* \* \* \*